(12) United States Patent
Narendra et al.

(10) Patent No.: US 7,991,158 B2
(45) Date of Patent: Aug. 2, 2011

(54) SECURE MESSAGING

(75) Inventors: Siva G. Narendra, Portland, OR (US);
Prabhakar Tadepalli, Karnatake (IN);
Thomas N. Spitzer, Portland, OR (US);
Asoke Talukder, Karnatake (IN)

(73) Assignee: Tyfone, Inc., Portland, OR (US)

( * ) Notice: Subject to any disclaimer, the term of this patent is extended or adjusted under 35 U.S.C. 154(b) by 908 days.

(21) Appl. No.: 11/895,637

(22) Filed: Aug. 24, 2007

(65) Prior Publication Data

US 2008/0279381 A1    Nov. 13, 2008

Related U.S. Application Data

(60) Provisional application No. 60/874,578, filed on Dec. 13, 2006.

(51) Int. Cl.
*H04L 9/00* (2006.01)
*H04L 9/12* (2006.01)

(52) U.S. Cl. ......................... 380/260; 380/262

(58) Field of Classification Search .......... 713/191–194; 717/174–178; 380/260, 262, 273, 274, 280, 380/44
See application file for complete search history.

(56) References Cited

U.S. PATENT DOCUMENTS

| | | | |
|---|---|---|---|
| 4,701,601 A | 10/1987 | Francini et al. | |
| 4,786,791 A | 11/1988 | Hodama | |
| 4,791,283 A | 12/1988 | Burkhardt | |
| 5,574,273 A | 11/1996 | Nakagawa et al. | |
| 5,585,787 A | 12/1996 | Wallerstein | |
| 5,700,037 A | 12/1997 | Keller et al. | |
| 5,710,421 A | 1/1998 | Kokubu et al. | |
| 5,834,756 A | 11/1998 | Gutman et al. | |
| 5,909,491 A * | 6/1999 | Luo | 380/270 |
| 5,952,641 A | 9/1999 | Korshun | |
| 5,955,961 A | 9/1999 | Wallerstein | |
| 6,016,476 A | 1/2000 | Maes et al. | |
| 6,021,944 A | 2/2000 | Arakaki | |
| 6,039,260 A | 3/2000 | Eisele | |
| 6,068,184 A | 5/2000 | Barnett | |
| 6,182,891 B1 | 2/2001 | Furuhashi et al. | |
| 6,189,786 B1 | 2/2001 | Itou et al. | |
| 6,206,293 B1 | 3/2001 | Gutman et al. | |
| 6,219,439 B1 | 4/2001 | Burger | |
| 6,223,984 B1 | 5/2001 | Renner et al. | |
| 6,250,557 B1 | 6/2001 | Forslund et al. | |
| 6,315,195 B1 | 11/2001 | Ramachandran | |
| 6,402,029 B1 | 6/2002 | Gangi | |

(Continued)

FOREIGN PATENT DOCUMENTS

DE    3632294 A1    4/1988

(Continued)

OTHER PUBLICATIONS

PCT Search Report, Application: PCT/US2006/006361; 13 pgs, 2006.

(Continued)

*Primary Examiner* — Edward Zee
(74) *Attorney, Agent, or Firm* — LeMoine Patent Services, PLLC; Dana B. LeMoine

(57) ABSTRACT

Secure authentication and messaging for mobile online transactions are performed by a secure messaging platform. The secure messaging platform may include a token coupled to a mobile device, or a mobile device alone. The token enables secure access, and client and server protocols enable secure transactions using text/SMS messaging.

22 Claims, 14 Drawing Sheets

U.S. PATENT DOCUMENTS

| | | |
|---|---|---|
| 6,481,623 B1 | 11/2002 | Grant et al. |
| 6,568,600 B1 | 5/2003 | Carpier et al. |
| 6,588,660 B1 | 7/2003 | Buescher et al. |
| 6,592,044 B1 | 7/2003 | Wong et al. |
| 6,594,759 B1 | 7/2003 | Wang |
| 6,598,031 B1 | 7/2003 | Ice |
| 6,607,127 B2 | 8/2003 | Wong |
| 6,609,654 B1 | 8/2003 | Anderson et al. |
| 6,631,849 B2 | 10/2003 | Blossom |
| 6,636,833 B1 | 10/2003 | Flitcroft et al. |
| 6,669,487 B1 | 12/2003 | Nishizawa |
| 6,705,520 B1 | 3/2004 | Pitroda et al. |
| 6,712,277 B2 | 3/2004 | Spencer |
| 6,715,679 B1 | 4/2004 | Infosino |
| 6,721,196 B1 | 4/2004 | Grassl |
| 6,764,005 B2 | 7/2004 | Cooper |
| 6,769,607 B1 | 8/2004 | Pitroda et al. |
| 6,805,288 B2 | 10/2004 | Routhenstein et al. |
| 6,811,082 B2 | 11/2004 | Wong |
| 6,836,843 B2 | 12/2004 | Seroussi et al. |
| 6,857,566 B2 | 2/2005 | Wankmueller |
| 6,882,900 B1 | 4/2005 | Terranova |
| 6,883,718 B1 | 4/2005 | Le et al. |
| 6,905,072 B2 | 6/2005 | Ramachandran |
| 6,907,123 B1 * | 6/2005 | Schier ............................ 380/28 |
| 6,908,030 B2 | 6/2005 | Rajasekaran et al. |
| 6,925,568 B1 * | 8/2005 | Heinonen .................... 713/193 |
| 7,059,520 B1 | 6/2006 | Shtesl |
| 7,333,062 B2 | 2/2008 | Leizerovich et al. |
| 7,581,678 B2 | 9/2009 | Narendra et al. |
| 7,828,214 B2 | 11/2010 | Narendra et al. |
| 2001/0002035 A1 | 5/2001 | Kayanakis |
| 2001/0006902 A1 | 7/2001 | Ito |
| 2001/0013551 A1 | 8/2001 | Ramachandran |
| 2002/0007434 A1 | 1/2002 | Campardo |
| 2002/0043566 A1 | 4/2002 | Goodman et al. |
| 2002/0044043 A1 | 4/2002 | Chaco et al. |
| 2002/0095588 A1 | 7/2002 | Shigematsu et al. |
| 2002/0096570 A1 | 7/2002 | Wong et al. |
| 2002/0099665 A1 | 7/2002 | Burger et al. |
| 2002/0130187 A1 | 9/2002 | Berg et al. |
| 2002/0138422 A1 | 9/2002 | Natsuno |
| 2002/0138735 A1 | 9/2002 | Felt et al. |
| 2002/0139849 A1 | 10/2002 | Gangi |
| 2002/0148892 A1 | 10/2002 | Bardwell |
| 2002/0153424 A1 | 10/2002 | Li |
| 2002/0158747 A1 | 10/2002 | McGregor et al. |
| 2002/0178124 A1 | 11/2002 | Lewis |
| 2002/0180584 A1 | 12/2002 | McGregor et al. |
| 2002/0186845 A1 | 12/2002 | Dutta et al. |
| 2003/0028481 A1 | 2/2003 | Flitcroft et al. |
| 2003/0052168 A1 | 3/2003 | Wong |
| 2003/0057278 A1 | 3/2003 | Wong |
| 2003/0061168 A1 | 3/2003 | Routhenstein |
| 2003/0080183 A1 | 5/2003 | Rajasekaran et al. |
| 2003/0115126 A1 | 6/2003 | Pitroda |
| 2003/0159050 A1 | 8/2003 | Gantman et al. |
| 2003/0200180 A1 | 10/2003 | Phelan et al. |
| 2003/0220876 A1 | 11/2003 | Burger et al. |
| 2003/0231550 A1 | 12/2003 | Macfarlane |
| 2004/0030660 A1 | 2/2004 | Shatford |
| 2004/0035942 A1 | 2/2004 | Silverman |
| 2004/0050930 A1 | 3/2004 | Rowe |
| 2004/0058705 A1 | 3/2004 | Morgan et al. |
| 2004/0064612 A1 | 4/2004 | Pinto et al. |
| 2004/0077372 A1 | 4/2004 | Halpern |
| 2004/0087339 A1 | 5/2004 | Goldthwaite et al. |
| 2004/0094624 A1 | 5/2004 | Fernandes et al. |
| 2004/0133787 A1 | 7/2004 | Doughty et al. |
| 2004/0188519 A1 | 9/2004 | Cassone |
| 2004/0199469 A1 | 10/2004 | Barillova et al. |
| 2004/0243806 A1 | 12/2004 | McKinley et al. |
| 2004/0251303 A1 | 12/2004 | Cooper |
| 2004/0255145 A1 | 12/2004 | Chow |
| 2005/0006462 A1 | 1/2005 | Rouille et al. |
| 2005/0017068 A1 | 1/2005 | Zalewski et al. |
| 2005/0022002 A1 | 1/2005 | Poisner |
| 2005/0029349 A1 | 2/2005 | McGregor et al. |
| 2005/0038736 A1 | 2/2005 | Saunders |
| 2005/0039027 A1 | 2/2005 | Shapiro |
| 2005/0044044 A1 | 2/2005 | Burger |
| 2005/0050367 A1 | 3/2005 | Burger et al. |
| 2005/0060586 A1 | 3/2005 | Burger et al. |
| 2005/0071282 A1 | 3/2005 | Lu et al. |
| 2005/0077349 A1 | 4/2005 | Bonalle |
| 2005/0092830 A1 | 5/2005 | Blossom |
| 2005/0108096 A1 | 5/2005 | Burger et al. |
| 2005/0109838 A1 | 5/2005 | Linlor |
| 2005/0116026 A1 | 6/2005 | Burger et al. |
| 2005/0121512 A1 | 6/2005 | Wankmueller |
| 2005/0122209 A1 | 6/2005 | Black |
| 2005/0127164 A1 | 6/2005 | Wankmueller |
| 2005/0127166 A1 | 6/2005 | Minemura |
| 2005/0133606 A1 | 6/2005 | Brown |
| 2005/0136964 A1 * | 6/2005 | Le Saint et al. ................ 455/522 |
| 2005/0168339 A1 | 8/2005 | Arai et al. |
| 2005/0177724 A1 | 8/2005 | Ali et al. |
| 2005/0197859 A1 | 9/2005 | Wilson et al. |
| 2005/0212657 A1 | 9/2005 | Simon |
| 2005/0224589 A1 | 10/2005 | Park et al. |
| 2005/0240778 A1 | 10/2005 | Saito et al. |
| 2005/0258245 A1 | 11/2005 | Bates et al. |
| 2005/0268058 A1 | 12/2005 | Drasnin et al. |
| 2006/0011731 A1 | 1/2006 | Anders et al. |
| 2006/0027655 A1 | 2/2006 | Smets et al. |
| 2006/0124755 A1 | 6/2006 | Ito |
| 2006/0169778 A1 | 8/2006 | Chung |
| 2006/0186209 A1 | 8/2006 | Narendra et al. |
| 2006/0226217 A1 | 10/2006 | Narendra et al. |
| 2007/0076877 A1 * | 4/2007 | Camp et al. ................... 380/255 |
| 2007/0145135 A1 | 6/2007 | Jogand-Coulomb et al. |
| 2007/0145152 A1 | 6/2007 | Jogand-Coulomb et al. |
| 2007/0257797 A1 | 11/2007 | Rancien et al. |
| 2007/0293202 A1 | 12/2007 | Moshir et al. |
| 2008/0214111 A1 | 9/2008 | Moshir et al. |
| 2008/0244208 A1 | 10/2008 | Narendra et al. |
| 2008/0279381 A1 | 11/2008 | Narendra et al. |
| 2009/0065571 A1 | 3/2009 | Jain |
| 2009/0065572 A1 | 3/2009 | Jain |
| 2009/0069049 A1 | 3/2009 | Jain |
| 2009/0069050 A1 | 3/2009 | Jain et al. |
| 2009/0069051 A1 | 3/2009 | Jain et al. |
| 2009/0069052 A1 | 3/2009 | Jain et al. |
| 2009/0070272 A1 | 3/2009 | Jain |
| 2009/0070691 A1 | 3/2009 | Jain |
| 2009/0070861 A1 | 3/2009 | Jain |
| 2009/0108063 A1 | 4/2009 | Jain et al. |
| 2009/0152361 A1 | 6/2009 | Narendra et al. |
| 2009/0199283 A1 | 8/2009 | Jain |
| 2009/0265552 A1 | 10/2009 | Moshir et al. |
| 2009/0298540 A1 | 12/2009 | Narendra et al. |
| 2010/0033307 A1 | 2/2010 | Narendra et al. |
| 2010/0033310 A1 | 2/2010 | Narendra et al. |
| 2010/0213265 A1 | 8/2010 | Narendra et al. |
| 2011/0053644 A1 | 3/2011 | Narendra et al. |
| 2011/0073663 A1 | 3/2011 | Narendra et al. |
| 2011/0073665 A1 | 3/2011 | Narendra et al. |
| 2011/0077052 A1 | 3/2011 | Narendra et al. |

FOREIGN PATENT DOCUMENTS

| | | |
|---|---|---|
| DE | 10054890 A1 | 4/2002 |
| EP | 161060 A1 | 11/1985 |
| EP | 0818757 A2 | 1/1998 |
| EP | 1014290 A2 | 6/2000 |
| EP | 1117068 A1 | 7/2001 |
| EP | 1178450 A2 | 2/2002 |
| EP | 1189465 A1 | 3/2002 |
| EP | 1291748 A2 | 3/2003 |
| GB | 2316908 | 3/1998 |
| TW | I336449 B | 1/2011 |
| WO | 9626500 A1 | 8/1996 |
| WO | 98/12674 A2 | 3/1998 |
| WO | 00/14678 A1 | 3/2000 |
| WO | 0188659 A3 | 11/2001 |
| WO | 03081519 A2 | 3/2003 |
| WO | 03029942 A2 | 4/2003 |
| WO | 03/077473 A1 | 9/2003 |

| WO | 2004/012352 A1 | 2/2004 |
| WO | 2004/095169 A2 | 11/2004 |
| WO | 2005/027030 A1 | 3/2005 |
| WO | 2005/119607 A2 | 12/2005 |
| WO | 2005/119607 A3 | 12/2005 |
| WO | 2005/119608 A1 | 12/2005 |
| WO | 2006091709 A2 | 2/2006 |
| WO | 2006/091709 A3 | 8/2006 |
| WO | 2006091709 A3 | 8/2006 |
| WO | 2006/108184 A1 | 12/2006 |
| WO | 2007/011937 A2 | 1/2007 |
| WO | WO-2008/121566 | 10/2008 |
| WO | 2009147548 A2 | 12/2009 |
| WO | 2010/099093 A1 | 9/2010 |

OTHER PUBLICATIONS

Lee, Youbok "Anntenna Circuit Design for RFID Applications", Lee, Youbok; *"Anntenna Circuit Design For RFID Applications", Microchip*, AN710, 2003 Microchip Technology Inc., 50 pages, (2003).

* cited by examiner

CLIENT ORIGINATED QUERY-RESPONSE CYCLE

|  | CLIENT KEY | SERVER KEY |
|---|---|---|
| COMPOSE QUERY | $K_I$ | $K_I$ |
| SUCCESSFULLY SENT QUERY | $K_{I+1}$ | $K_I$ ← 810 |
| SUCCESSFULLY RECEIVED QUERY | $K_{I+1}$ | $K_{I+1}$ |
| COMPOSE RESPONSE | $K_{I+1}$ | $K_{I+1}$ |
| SUCCESSFULLY SENT RESPONSE | $K_{I+1}$ | $K_{I+2}$ ← 820 |
| SUCCESSFULLY RECEIVED RESPONSE | $K_{I+2}$ | $K_{I+2}$ |

SERVER ORIGINATED QUERY-RESPONSE CYCLE

|  | CLIENT KEY | SERVER KEY |
|---|---|---|
| COMPOSE QUERY | $K_J$ | $K_J$ |
| SUCCESSFULLY SENT QUERY | $K_J$ | $K_{J+1}$ ← 830 |
| SUCCESSFULLY RECEIVED QUERY | $K_{J+1}$ | $K_{J+1}$ |
| COMPOSE RESPONSE | $K_{J+1}$ | $K_{J+1}$ |
| SUCCESSFULLY SENT RESPONSE | $K_{J+2}$ | $K_{J+1}$ ← 840 |
| SUCCESSFULLY RECEIVED RESPONSE | $K_{J+2}$ | $K_{J+2}$ |

*FIG. 8*

SECURE MESSAGING

RELATED APPLICATIONS

Benefit is claimed under 35 U.S.C. 119(e) to U.S. Provisional Application Ser. No. 60/874,578, entitled "Secure Messaging" by Narendra et al., filed Dec. 13, 2006, which is herein incorporated in its entirety by reference for all purposes.

FIELD

The present invention relates generally to electronic devices, and more specifically to electronic devices that perform messaging.

BACKGROUND

Mobile devices typically communicate using a control channel and a traffic channel. For example, as shown in FIG. 1, mobile device 100 performs call set-up using a control channel, and communicates voice and data using a traffic channel. A control channel can also send text messages and/or short message service (SMS) messages.

Typically, secure mobile communications are accomplished using secure data packets over the traffic channel. For example, in a typical secure data exchange, a call is set-up using the control channel, and secure data is exchanged using the traffic channel. The data is typically secured using a standard secure protocol, such as those available under TCP/IP.

Most modern wireless mobile devices such as cellular telephones are capable of secure communications over the traffic channel; however, many wireless carriers require that users subscribe to "data services" in order to use the data capabilities of the mobile device. This is problematic for a third party application provider that desires to implement secure communications to/from a mobile device, since mobile device users may have to subscribe to additional services in order to enjoy the benefits of the third party application.

BRIEF DESCRIPTION OF THE DRAWINGS

FIG. 8 shows client and server originated query-response cycles;

DESCRIPTION OF EMBODIMENTS

Figure 1:
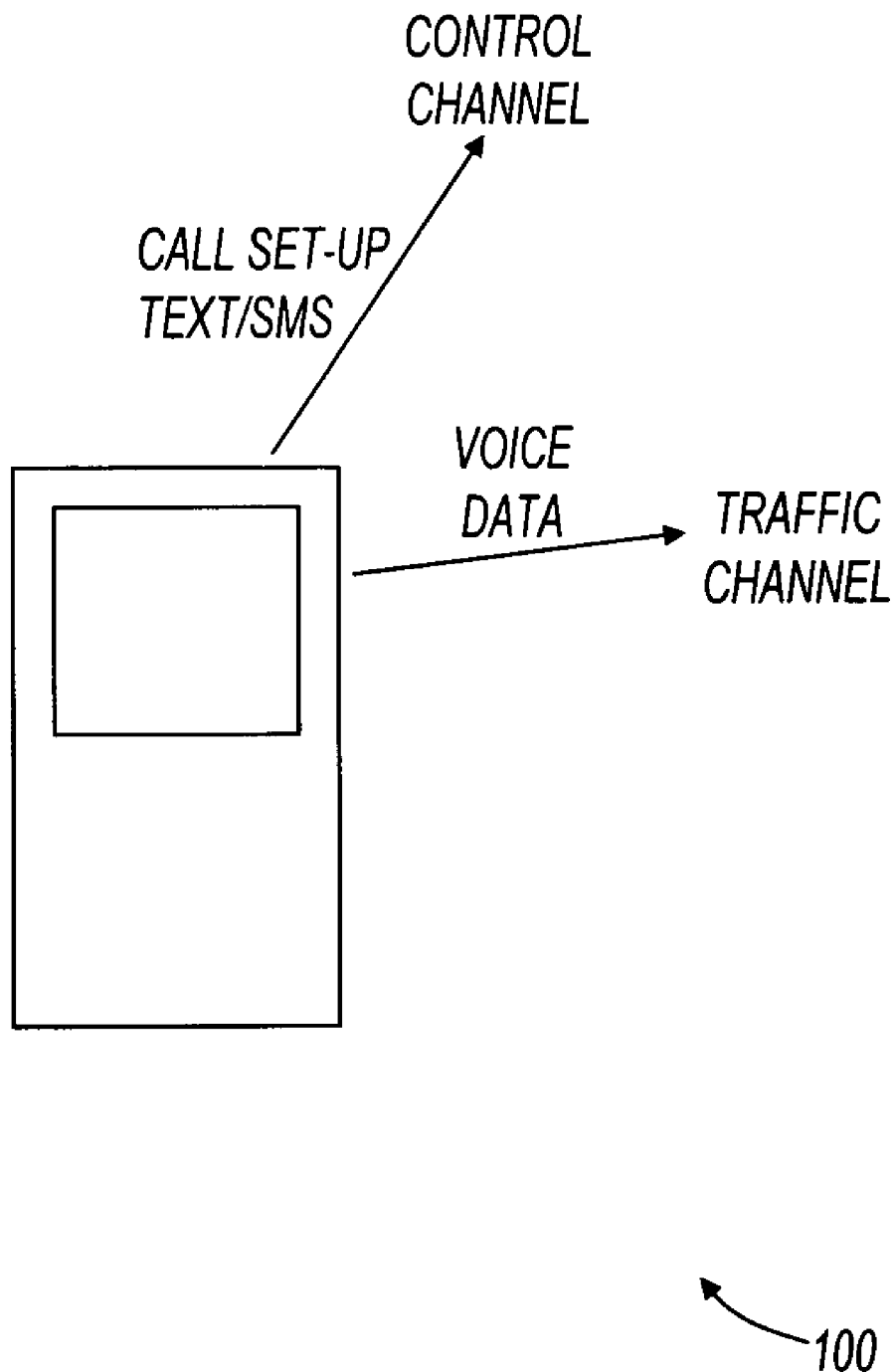
FIG. 1 shows a prior art mobile device.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The various embodiments of the present invention relate generally to secure mobile transactions. For example, various embodiments relate to secure authentication and messaging for mobile online transactions for (1) enabling secure access to a client mobile device including a mobile phone and (2) to enable secure transactions using text messaging/SMS to/from a client mobile device such as a mobile phone. Note that the secure access component is applicable to any client device, and is not limited to devices that are mobile.

Various embodiments include (1) a token card for enabling secure access and (2) client and gateway protocols to enable secure transactions using text/SMS messaging. The token card is a tamper evident component that has the ability to communicate to a client device via one of several standard I/O protocols including memory card protocols or high speed interface protocols such as universal serial bus (USB). The token may also store information internally to enable secure storage, secure authentication, and secure information exchange. The server protocol software in conjunction with the client enables synchronized cryptography functions for secure text messaging/SMS.

Figure 2:
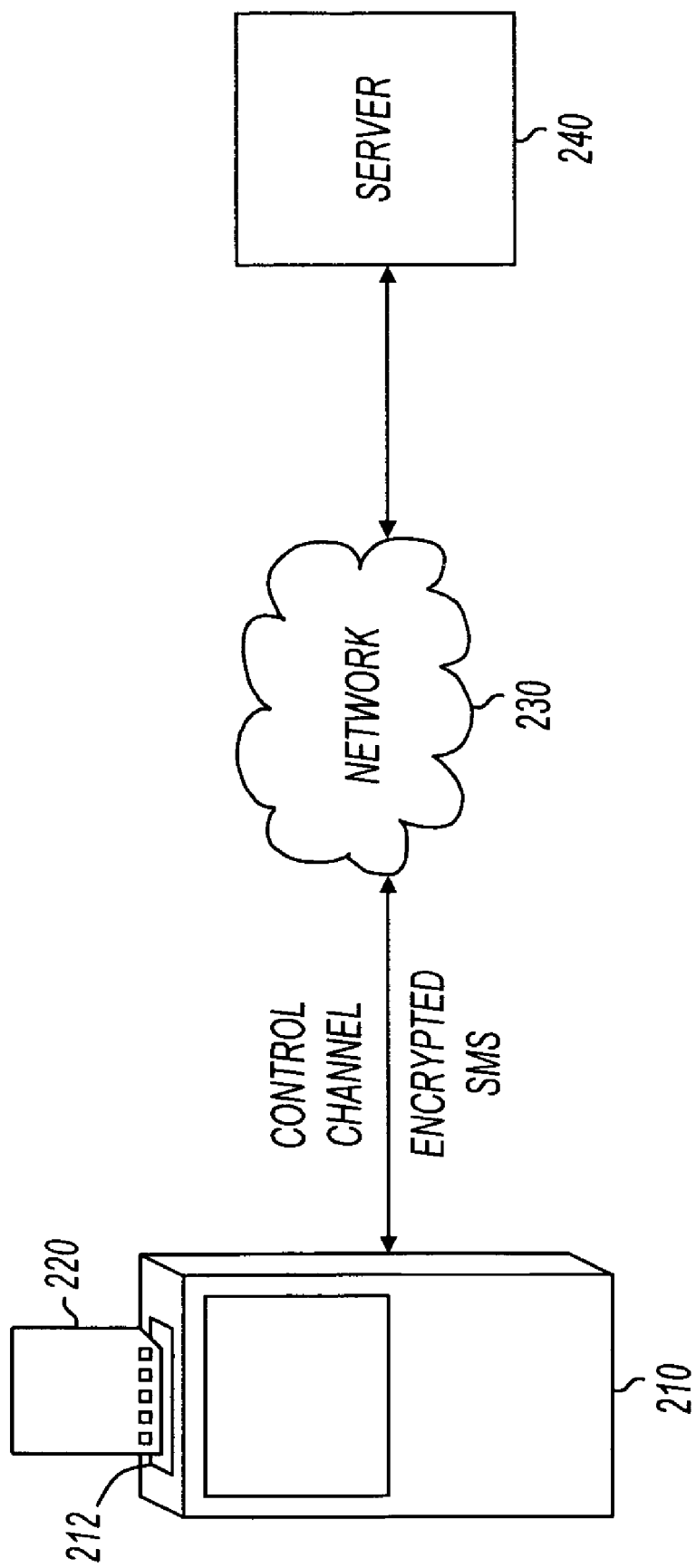
FIG. 2 shows a mobile device communicating with a server using encrypted short message service (SMS) communications.

FIG. 2 shows a mobile device communicating with a server using encrypted short message service (SMS) communications. Mobile device 210 communicates with server 240 over network 230. The SMS messages include an SMS-compatible encrypted payload. For example, mobile device 210 may encrypt a payload and then map the encrypted result to a character set compatible with SMS protocols. Various embodiments of secure messaging communications are described further below.

Mobile device 210 may be any device capable of messaging over a control channel. For example, mobile device 210 may be a cellular telephone, a smartphone, a personal digital assistant (PDA), a laptop computer, a desktop computer, or any other device capable of short message communications. Although the various embodiments are described with reference to SMS communications, the invention is not so limited. For example, the secure messaging embodiments of the present invention are applicable in other short messaging scenarios such as instant messaging and text messaging.

Token 220 is a device that interfaces with mobile device 210, and that may hold encryption/decryption information to enable secure messaging. Token 220 may also include a processing element and memory. Token 220 may be involved with authentication, encryption, decryption, and the like. Token 220 may be temporarily couple to mobile device 210. Various token embodiments and their functions are described further below. In some embodiments, token 220 is not included, and the token functions described herein are either omitted or included in mobile device 210.

Network 230 may be any type of network capable of passing secure messaging communications on an out-of-band signaling channel. For example, a signaling channel within network 230 may be a physically separate channel that physically separates control information from voice/data, or the signaling channel may be a logically separate channel that shares a physical medium with the voice/data. In some embodiments, the signaling channel is implemented using a signaling system 7 (SS7) protocol. Further, network 230 may include signaling system 7 (SS7) infrastructure components such as signal switching points (SSPs), signal transfer points (STPs), and signal control points (SCPs).

Server 240 may be any type of system capable of secure messaging communications. For example, server 240 may function as a signal switching point (SSP) or a signal end point (SEP) in an SS7 network. In some embodiments, server 240 may communicate with one mobile device at a time. In other embodiments, server 240 may communicate with multiple mobile devices using secure messaging. For example, server 240 may engage in multiple secure communications sessions simultaneously.

In operation, mobile device 210 encrypts data to produce an encrypted message. The encrypted message is then mapped to a series of characters that are compatible with the messaging protocol in use, resulting in a secure messaging payload. For example, in SMS embodiments, the resulting SMS message holds a secure payload. In some embodiments, token 220 includes information necessary for the mobile device to encrypt/decrypt the SMS messages. For example, encryption/decryption keys or seeds may be maintained in token 220. In these embodiments, secure messaging requires token 220 to be mated to mobile device 210. In other embodiments, mobile device 210 maintains the encryption/decryption keys or seeds, and token 220 is not included.

Mobile device 210 includes add-on slot 212. Add-on slot 212 is a slot capable of accepting token 220. For example, add-on slot 210 may have physical dimensions compatible with token 220, and may have a communications interface that operates using a protocol compatible with token 220. In some embodiments of the present invention, add-on slot 212 is a memory card slot designed to accept and communicate with memory cards. As used herein, the term "memory card slot" refers to any add-on slot capable of accepting a card having memory accessible by a mobile device such as that shown in FIG. 2. For example, a memory card slot may be a proprietary card slot designed to accept memory cards that adhere to a proprietary communications protocol. Also for example, a memory card slot may be compatible with an industry standard communications protocol, or may be compatible with a widely accepted communications protocol that is not necessarily formally documented as an industry standard. Examples include slots that are compatible with the Multimedia Memory Card (MMC) protocol, Memory Stick DUO protocol, secure digital (SD) protocol, and Smart Media protocol. The foregoing list is meant to be exemplary, and not exhaustive. Add-on slot 212 may be compatible with many memory card slot protocols other than those explicitly listed above without departing from the scope of the invention.

In some embodiments, add-on slot 212 is a universal serial bus (USB) connector. In these embodiments, token 220 includes a mating USB connector. The various embodiments of the present invention are not limited by the type of connection between token 220 and mobile device 210. For example, the connection between token 220 and mobile device 210 may be any wired or wireless connection.

Figure 3A:
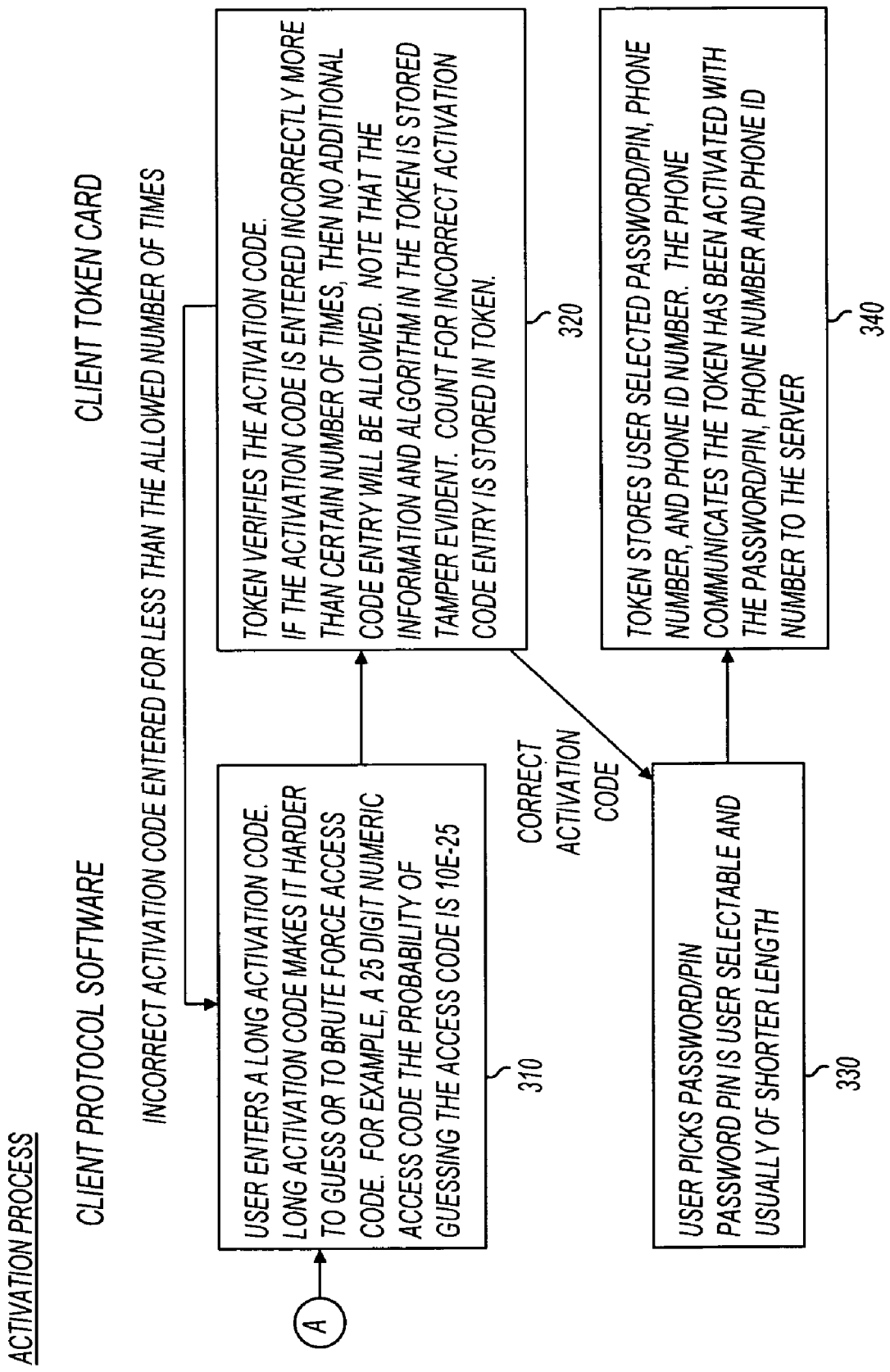
FIG. 3 shows a secure authentication protocol.
Figure 3B:
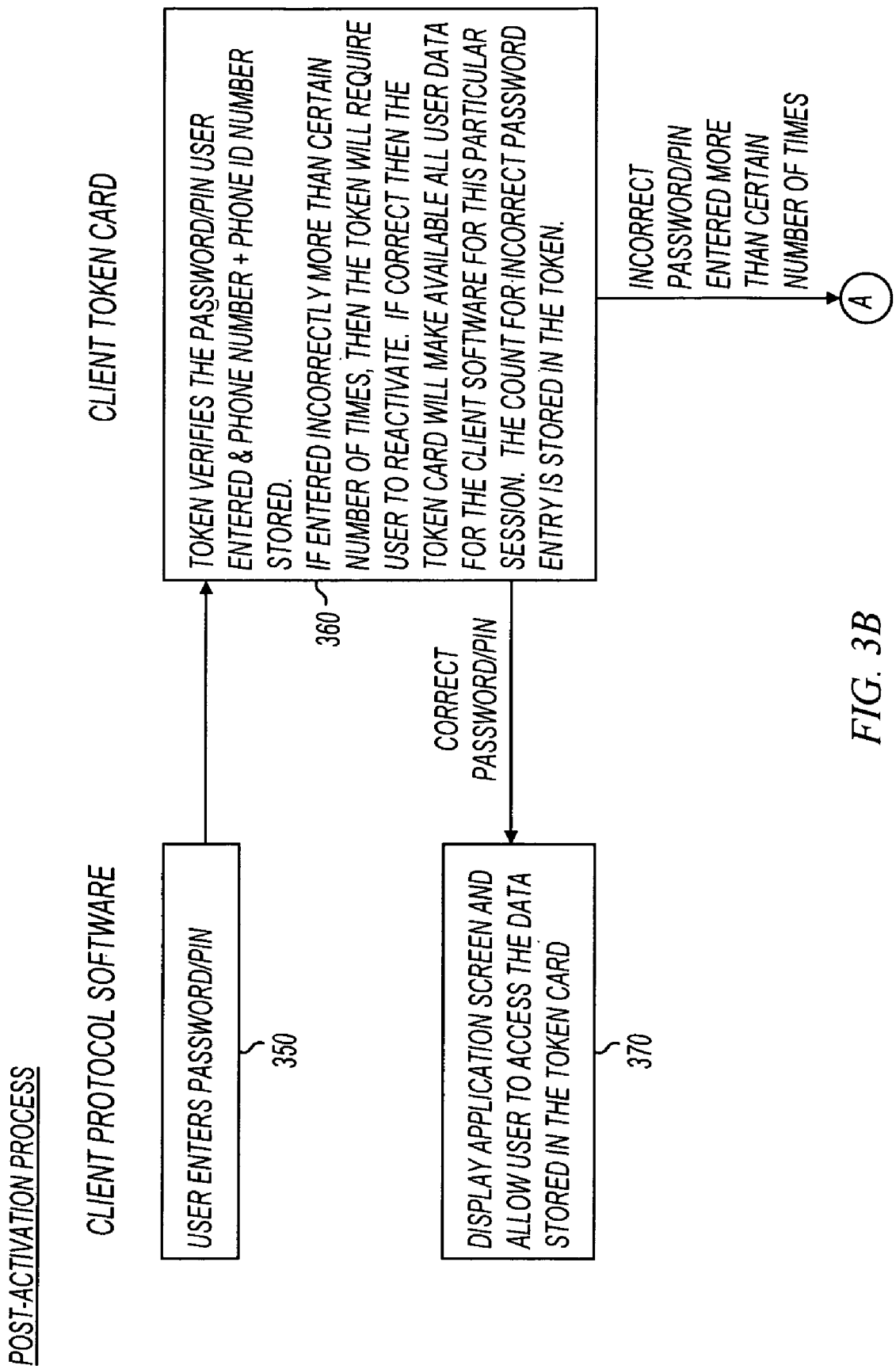

FIG. 3 shows a secure authentication protocol. Secure authentication protocol 300 describes how a user may authenticate to a secure messaging platform prior to commencing secure messaging. In some embodiments, the secure messaging platform includes a mobile device, and may or may not include a token. For example, secure authentication protocol 300 may be used to authenticate to mobile device 210 while communicating with token 220.

Secure authentication protocol 300 includes "activation access" and "post-activation access." The activation access is performed when a user authenticates for the first time in order to "activate" the secure messaging platform. Post-activation access is performed for subsequent authentications. The left column of FIG. 3 represents actions taken in software within a client. For example, the actions in the left column may be performed by software in mobile device 210 (FIG. 2). The right column of FIG. 3 represents actions taken within a token such as token 220 (FIG. 2). In embodiments without a token, both columns of FIG. 3 represent actions taken within a client (mobile device).

The client protocol software may start up when a token is connected to the client device. For example, a token may be delivered to a user, and the user may then insert the token into an add-on slot in the client. The client may automatically start the client protocol software, or the user may independently start the client protocol software. In some embodiments, the client protocol software is resident on the token, and when the token is first inserted in the add-on slot, the software is installed on the client device. The client protocol software begins the activation process at 310. At 310, a user enters an activation code, and at 320 the token verifies the activation code. If the activation code is entered incorrectly more than a certain number of times, no additional code entry will be allowed. If a correct activation code has been entered, the user is prompted to enter a password or personal identification number (PIN).

In some embodiments, the activation process at 310 may ask a user for identifying information known by a server. For example, a user may be prompted for a zip code or mother's maiden name. This identifying information may then be transmitted to a server for validation. Further, in some embodiments, the activation code may be transmitted to a server for verification, rather (or in addition to) the token verifying the activation code.

At 340, the token collects and stores the user selected password/PIN and identifying information corresponding to the mobile device. For example, the token may store the user selected password/PIN, the phone number (if applicable) of the mobile device, and an ID number that identifies the mobile device (phone ID number in cell phone embodiments). Identifying information may also include High Speed Switching Network (HSSN), SA Number, and/or international mobile equipment identity (IMEI). At this stage, activation access is successful, and the mobile device communicates to the server (240, FIG. 2) that the token has been activated. The mobile device may also communicate the password/PIN, phone number and phone ID number to the server. The phone number and phone ID are stored to ensure that future authentications are performed with same token/mobile device combination. In this matter, tokens are authenticated not only to users, but to mobile devices as well. In some embodiments, the phone ID and phone number are not stored, and the token will authenticate to a user regardless of the identity of the mobile device.

Post-activation access is performed each time a user wishes to authenticate to the messaging platform to send or receive secure messages. At 350, the user enters the password/PIN that was stored in the token at 340. At 360, the token verifies the password/PIN entered by the user. The token may also verify the stored phone number and phone ID against the phone number and phone ID of the mobile device with which it is communicating. The phone number and phone ID are checked in embodiments that authenticate a user to a token/mobile device pair.

If the password/PIN is entered incorrectly more than a certain number of times, the token will require the user to re-perform the activation process. If the password/PIN is entered correctly, then the token allows access to user data stored thereon. This may include encryption/decryption keys, seeds used to generate encryption/decryption keys, or any other data or software stored on the token.

After successful post-activation access (authentication), the client software makes token data available to the user on the mobile device display. In some embodiments, the user may not interface directly with user data stored on the token. For example, the client software may include application software that utilizes secure messaging, and the user may only interact with the application software. Encryption, decryption, character mapping, and other secure messaging components to may or may not be visible to the user.

As described above, once the PIN is entered, the token and the mobile device are "married." Both the token and the server are aware of the parameters defining the mobile device/token marriage. The parameters defining the marriage may include the token ID, mobile device ID, phone carrier ID, or any other identifying information. After marriage, when the user enters a PIN, the token will check to make sure that the marriage parameters are valid before validating the PIN. If any of the marriage parameters are invalid, access is denied, and re-activation becomes necessary. For example, if the token is coupled to a different mobile device, access is denied and re-activation becomes necessary. Likewise, if a communications carrier has changed, access is denied and re-activation becomes necessary.

The various embodiments described with reference to FIG. 3 are independent of the type of communications performed by the mobile device. For example, after authentication, the mobile device may communicate using a control channel or traffic channel (see FIG. 1). Further, the mobile device may communication using secure messaging, or may communicate in the clear.

Figure 4:
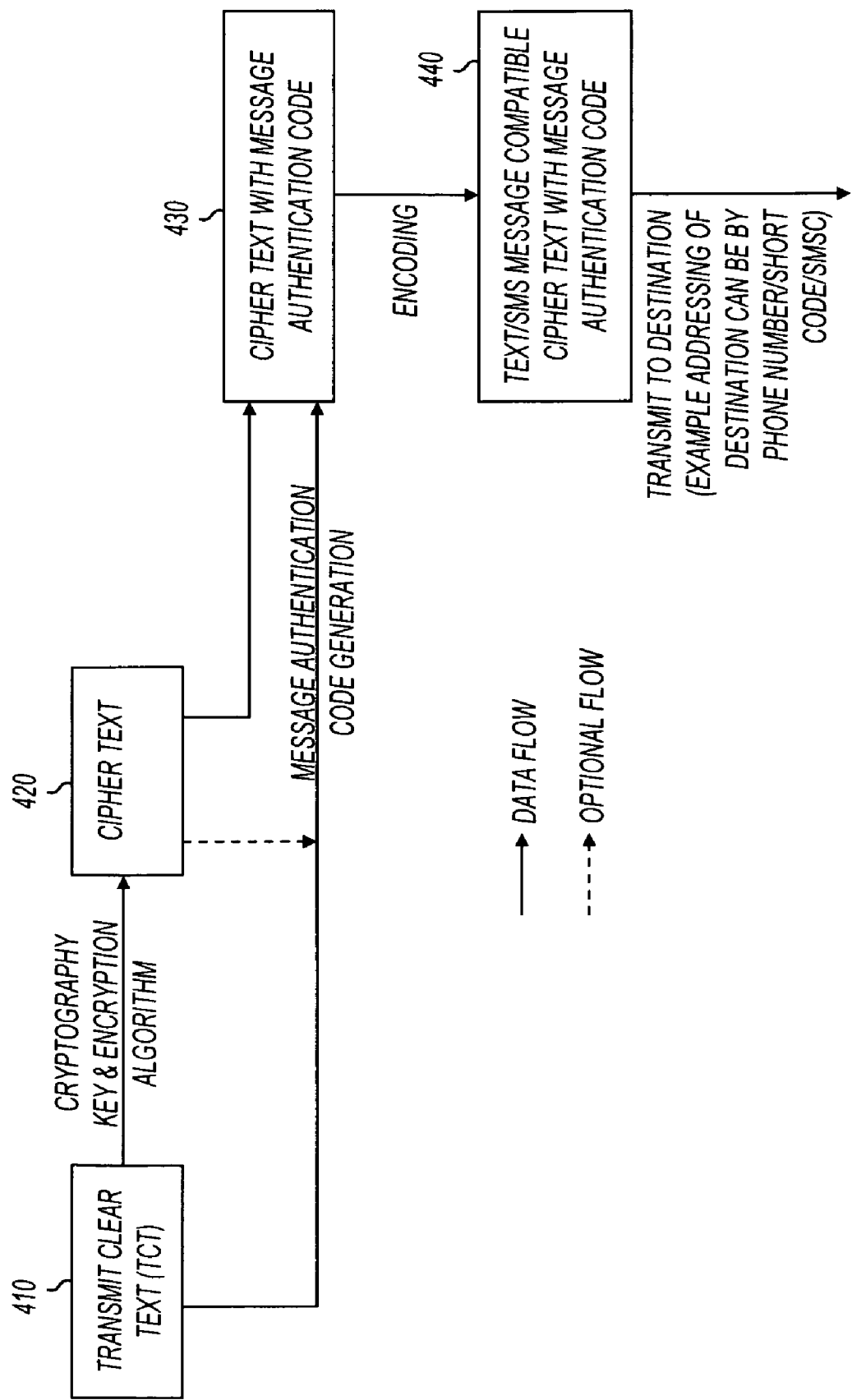
FIG. 4 shows the creation of SMS compatible secure messages.

FIG. 4 shows the creation of SMS compatible secure messages. The data flow shown in FIG. 4 may be performed by a mobile device or a mobile device in connection with a token as shown in FIG. 2. The data flow shown in FIG. 4 may also be performed by a server such as server 240 (FIG. 2). Transmit clear text (TCT) is shown at 410. The clear text is encrypted to become cipher text at 420. The cryptography key used to encrypt the clear text may be stored on a token, and a user must first be authenticated for the encryption operation to occur.

A message authentication code (MAC) may be determined from either the clear text or the cipher text. In some embodiments, determining the MAC may be as simple as computing parity bits on the clear text before encryption. In these embodiments, the MAC may be encrypted along with the clear text. In other embodiments, determining the MAC may include the use of a hashing function on the cipher text. In these embodiments, the MAC may be along with the cipher text.

At 430, the cipher text is shown with the message authentication code. The message authentication code may be part of the cipher text, or may be appended to the cipher text in the clear. The cipher text with MAC at 430 represents a secure payload to be in included in a message. In some embodiments, the cipher text may contain octets with binary combinations that are not "legal" in a messaging environment. For example, the octet "01111111" may be used as a marker in a message environment, and may not be available as a data character. Similarly, a messaging environment may only allow seven bit characters, and some may only allow a subset of all possible seven bit characters.

The secure payload is encoded to produce a text/SMS compatible payload at 440. In some embodiments, a mapping is performed from binary cipher text to messaging-compatible characters. The text/SMS compatible payload may then be included in a message that is transmitted in a mobile device control channel.

Figure 5:
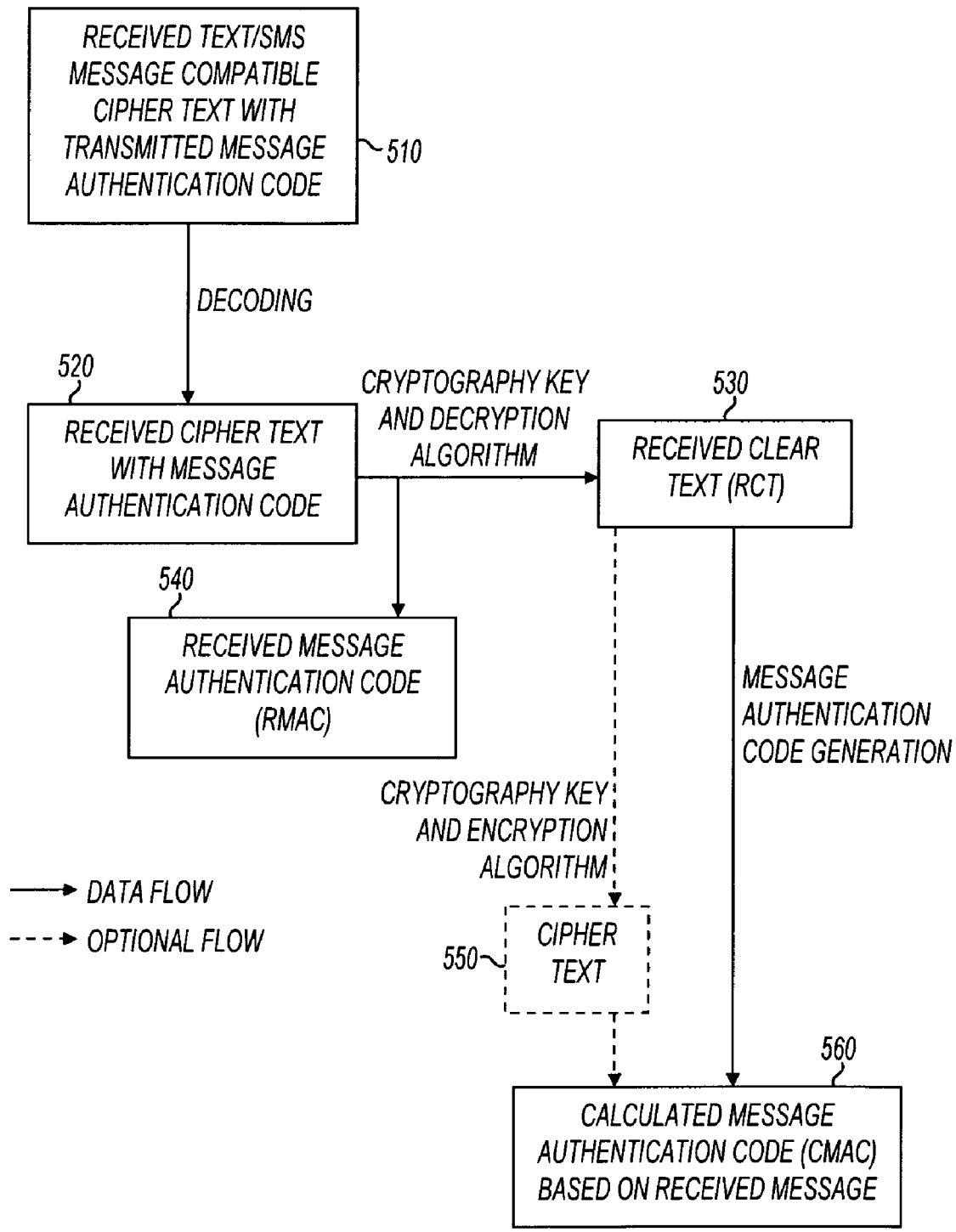
FIG. 5 shows the reception and recovery of SMS compatible secure messages.

FIG. 5 shows the reception and recovery of SMS compatible secure messages. The data flow shown in FIG. 5 may be performed by any of the secure messaging embodiments described herein. For example, a mobile device with or without a token may receive and recover SMS compatible secure messages. Also for example, a server such as server 240 (FIG. 2) may receive and recover SMS compatible secure messages.

At 510, a text/SMS compatible message is received. This received message corresponds to the message transmitted at the end of the data flow in FIG. 4. The received message may include a message authentication code, and the message authentication code may be included as part of the cipher text, or may be included along with the cipher text.

The received message is decoded to produce the received cipher text and MAC at 520. This corresponds to the inverse of the encoding operation performed in FIG. 4. Received clear text (RCT) 530 is produced from the cipher text using a decryption key. The MAC received as part of the text/SMS compatible message is shown at 540 as the received MAC (RMAC).

A calculated message authentication code (CMAC) is determined from the received clear text 530 at 560. The CMAC and RMAC can then be compared to determine if the message has been received correctly. In some embodiments, cipher text 550 is regenerated from the received clear text 530, and a CMAC is then calculated from the regenerated cipher text. This may be performed for embodiments in which the RMAC was calculated from the cipher text on the transmitting side.

Figure 6A:
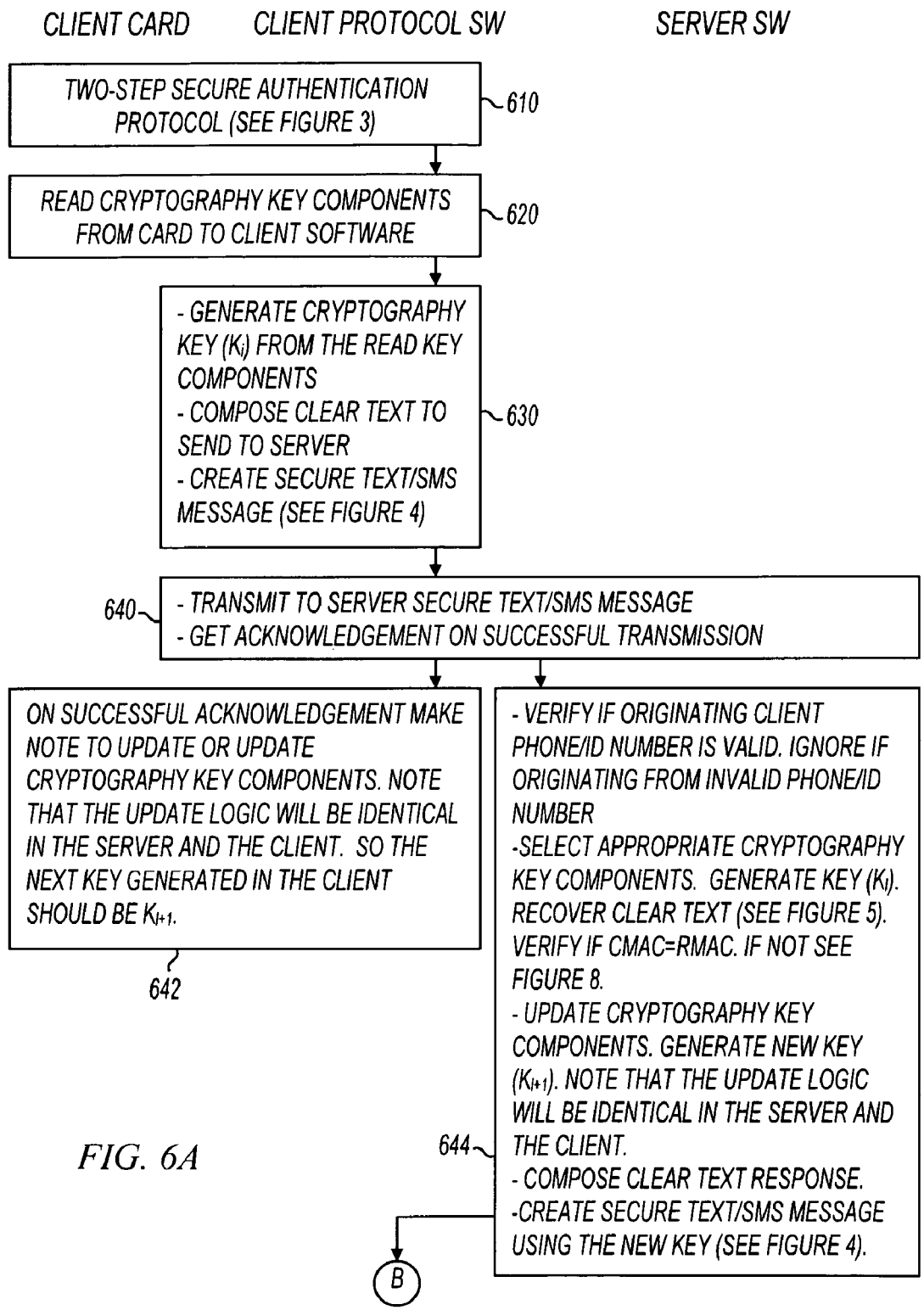
FIG. 6 shows a client originated client-server protocol for secure messaging.
Figure 6B:
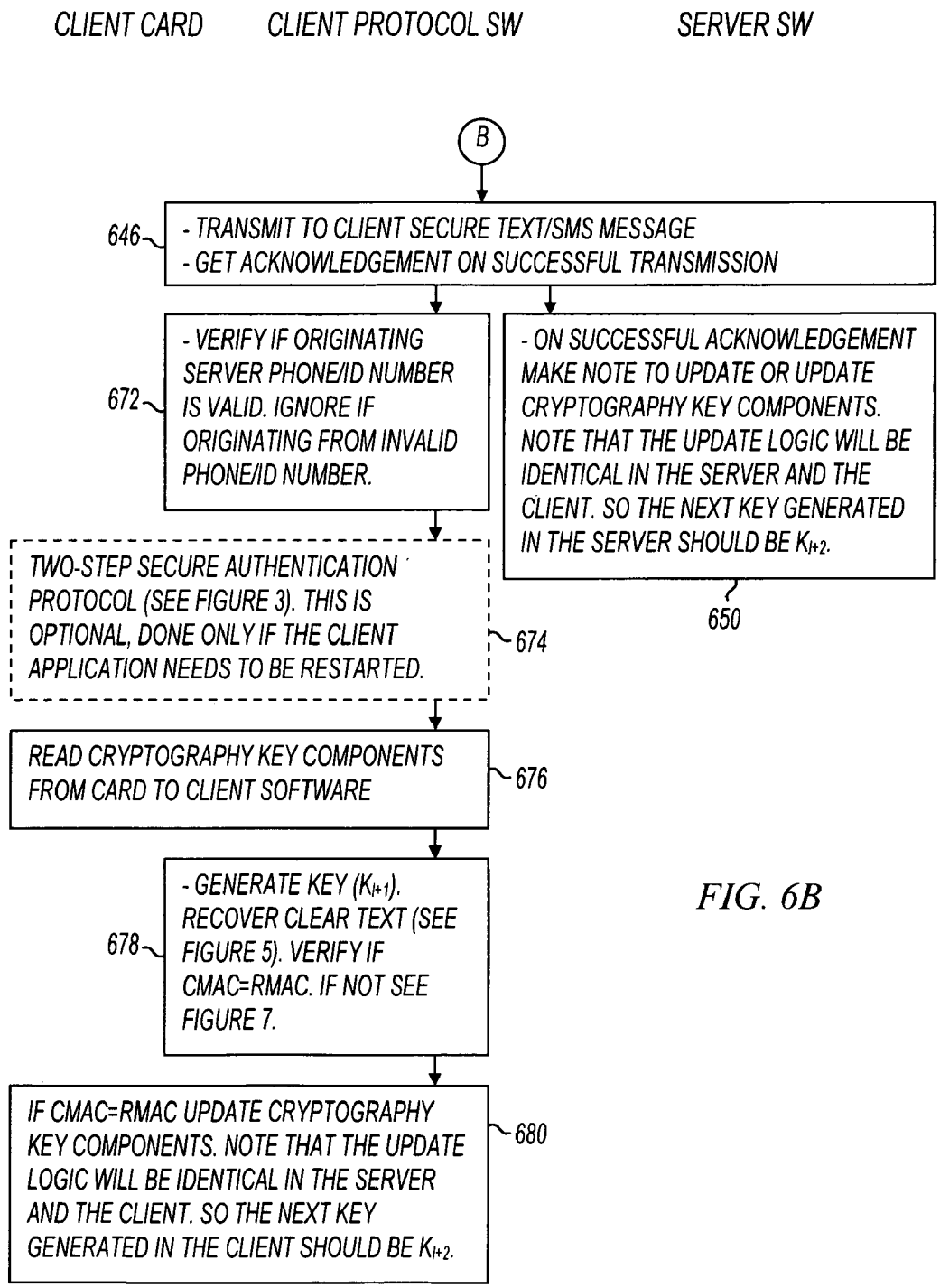

FIG. 6 shows a client originated client-server protocol for secure messaging. The left side of FIG. 6 shows actions taken by a client/token combination, and the right side of FIG. 6 shows actions taken by a server. In some embodiments, a token may not be employed, and left side of FIG. 6 represents the actions taken by a client alone. In various embodiments of the present invention, the server may be communicating with multiple clients, and may be maintaining separate cryptography keys for each of the clients.

At 610, a user authenticates to the client. If this is a first time use, both activation and post-activation authentications will take place. If this is not a first time use, then a user may authenticate using just the post-activation access. See FIG. 3.

At 620, cryptography key components are read from the token to client software. The cryptography key components may include one or more seed values and/or indices from which one or more cryptography keys are derived. For example, if variables "a" and "b" are stored in the token as seeds, and "c" is stored in the token as an index, a cryptography key may be generated from "$(a+c)^2+b^2$". The foregoing seed/index is provided as an example, and the various embodiments of the invention are not so limited.

At 630, the cryptography key ($K_i$) is generated from the key components read from the token; the clear text is composed; and a secure text/SMS message is created (see FIG. 4). At

640, the secure text/SMS message is transmitted to a server, and acknowledgement of successful transmission is received. In some embodiments, the acknowledgment is from an intermediate point such as a cell base station, and does not necessarily mean that the transmission has been successfully received at the server.

On acknowledgment of successful transmission, the client updates the cryptography key components to be stored in the token so that the next key generated at the client will be $K_{i+1}$. At 644, the server verifies if the originating client phone number and/or ID number is valid. If invalid, then the server may ignore the message. The server selects the appropriate cryptography key components, and generates key $K_i$. In some embodiments, the server maintains communications with multiple clients, and maintains a database with different cryptography key components for each client. The server may use the phone number and/or the phone ID to retrieve cryptography key components corresponding to the client device that originated the message.

The server recovers the clear text and RMAC, and calculates a CMAC described above with reference to FIG. 5. If RMAC equals CMAC, then the server continues; if not, the server attempts to determine if an incorrect key was used. See FIG. 8. The server updates the cryptography key components so that the next key generated at the server will be $K_{i+1}$. Continuing at 644, the server composes a clear text response using $K_{i+1}$, and creates a secure text/SMS response message.

At 646, the server transmits the secure text/SMS response message and receives acknowledgment of a successful transmission. As described above with reference to 640, an acknowledgment of successful transmission does not necessarily indicate that the client has received the secure text/SMS response. At 650, upon successful acknowledgment, the server updates the cryptography key components so that the next key generated at the server will be $K_{i+2}$.

At 672, the client receives the secure text/SMS response and verifies that the originating server is valid, and ignores the message if the originating server is invalid. At 674 an optional authentication process takes place. This may be necessary if the authentication from 610 is no longer valid. At 676, the cryptography key components are read from the token to the client software, and 678, the key $K_{i+1}$ is generated and used to recover clear text from the received text/SMS message response. A CMAC is calculated and compared with the received RMAC. If they match, then the key components are updated at 680 so that the next key to be used at the client is $K_{i+2}$.

As shown in FIG. 6, the encryption/decryption key is incremented at both the client and server after a secure text/SMS message is transmitted. By continually changing keys, the secure link is maintained in a very robust manner. In embodiments with continually changing keys, keys may become out sync at the client and server. Various embodiments remedy out-of-sync conditions as described below with reference to FIG. 8.

Figure 7A:
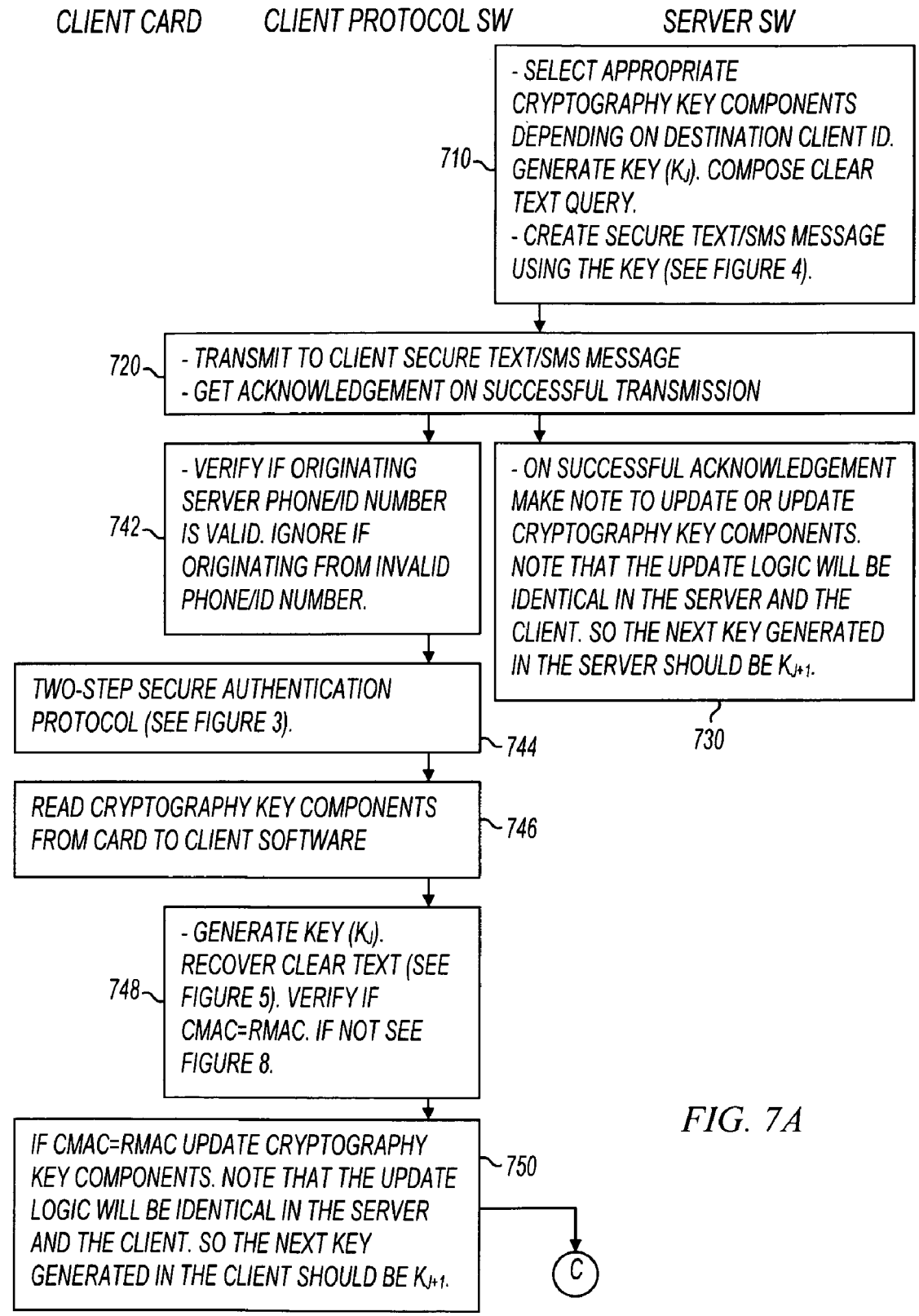
FIG. 7 shows a server originated client-server protocol for secure messaging.
Figure 7B:
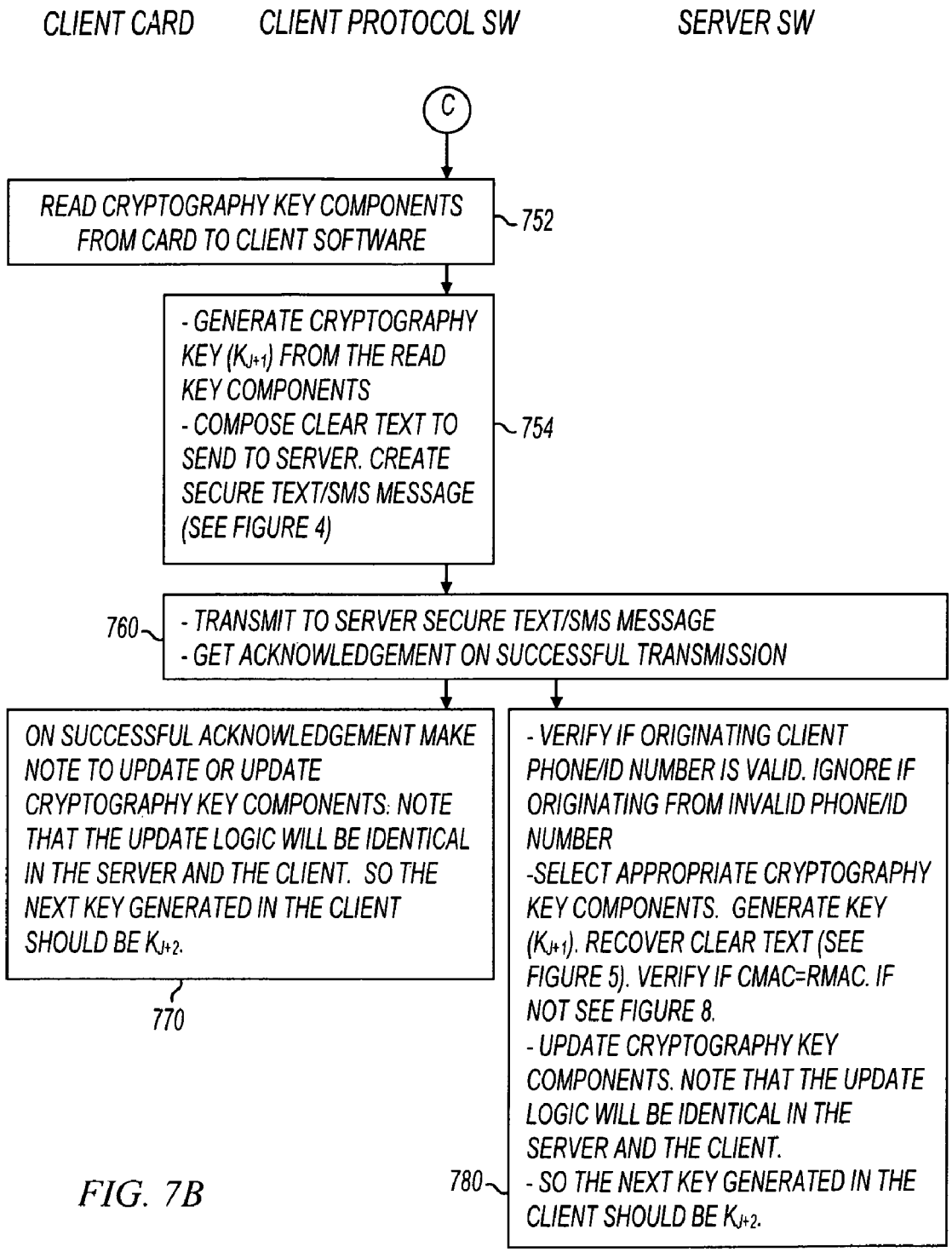

FIG. 7 shows a server originated client-server protocol for secure messaging. The flow shown in FIG. 7 is very similar to the flow shown in FIG. 6, with the exception that the secure exchange is initiated by the server rather than the client. The left side of FIG. 7 shows actions taken by a client/token combination, and the right side of FIG. 7 shows actions taken by a server. In some embodiments, a token may not be employed, and left side of FIG. 7 represents the actions taken by a client alone. In various embodiments of the present invention, the server may be communicating with multiple clients, and may be maintaining separate cryptography keys for each of the clients.

At 710, the appropriate cryptography key components are selected depending on the destination client. The cryptography key ($K_j$) is generated from the key components corresponding to the destination client; the clear text is composed; and a secure text/SMS message is created (see FIG. 4). At 720, the secure text/SMS message is transmitted to a client, and acknowledgement of successful transmission is received. In some embodiments, the acknowledgment is from an intermediate point such as a network node, and does not necessarily mean that the transmission has been successfully received at the client.

On acknowledgment of successful transmission, the server updates the cryptography key components so that the next key generated at the server will be $K_{j+1}$. At 742, the client verifies if the originating server phone number and/or ID number is valid. If invalid, then the client may ignore the message. At 744, a user authenticates to the client. If this is a first time use, both activation and post-activation authentications will take place. If this is not a first time use, then a user may authenticate using just the post-activation access. See FIG. 3.

The client reads the cryptography key components from the token at 746, and generates key $K_j$ at 748. The client recovers the clear text and RMAC, and calculates a CMAC described above with reference to FIG. 5. If RMAC equals CMAC, then the client continues; if not, the client attempts to determine if an incorrect key was used. See FIG. 8. The client updates the cryptography key components so that the next key generated at the client will be $K_{j+1}$. Continuing at 752, the client reads the updated cryptography key components and generates $K_{j+1}$. The client composes a clear text response to the server, and creates a secure text/SMS response message using $K_{j+1}$.

At 760, the client transmits the secure text/SMS response message and receives acknowledgment of a successful transmission. As described above with reference to 720, an acknowledgment of successful transmission does not necessarily indicate that the server has received the secure text/SMS response. At 770, upon successful acknowledgment, the client updates the cryptography key components so that the next key generated at the client will be $K_{j+2}$.

At 780, the server receives the secure text/SMS response and verifies that the originating client is valid, and ignores the message if the originating client is invalid. The appropriate cryptography key components are selected and the key $K_{j+1}$ is generated. The key $K_{j+1}$ is used to recover clear text from the received text/SMS message response. A CMAC is calculated and compared with the received RMAC. If they match, then the key components are updated so that the next key to be used at the server is $K_{j+2}$.

FIG. 8 shows client and server originated query-response cycles. Key status is shown for one complete query-response cycle, indicating that keys can go out of sync if message flow is interrupted in two out of the six states. For client originated query-response cycles, these two states are shown at 810 and 820. For server originated query-response cycles, these two states are shown at 830 and 840. Keys may also become out sync if a client and server simultaneously initiate queries. As shown in FIG. 8, different keys Ki and Kj may be used for client originated query-response cycles and server originated query-response cycles. In some embodiments client originated cycles and server originated cycles may share a common key.

Each client token has an originally programmed key component set capable of generating $K_i$, $K_j$, and $K_{ref}$. The server has the knowledge of the same key components. $K_{ref}$ is not used for any standard query or response. The initial key $K_i$, and subsequent keys, $K_{i+1}$, $K_{i+2}$, . . . are used for query or response in client originated query-response cycles. The initial key $K_j$, and subsequent keys, $K_{j+1}$, $K_{j+2}$, ... are used for query or response in client originated query-response cycles. is the one that can be generated mathematically with the next increment of the key component that generates $K_{ref}$.

When an incoming message does not generate CMAC=RMAC, then the receiving device increments to the next few and/or decrements to the previous few keys to determine if it can generate CMAC=RMAC. If that works, then the recipient can understand the query or the response.

If incrementing or decrementing by a few key increments is unsuccessful, then the receiving device uses $K_{ref}$ to see if it can generate CMAC equal to RMAC. If this works, then the sender has just sent to the receiver a new initial key, $K_i$, encrypted using $K_{ref}$. In some embodiments, only the server may reset the key. In these embodiments:

1) if the receiving device is a client device, then the client has just received from the server a new initial key, $K_i$, for synchronization encrypted using $K_{ref}$.

2) if the receiving device is the server, then it has just received from the client a request to send a new initial key, $K_i$, for synchronization encrypted using $K_{ref}$.

If using $K_{ref}$ does not generate CMAC=RMAC, then it is up to the receiving device to initiate the resynchronization of the client-server with a new initial key $K_i$. In embodiments that allow either the client or the server to reset the key, the receiving device generates a new initial key, $K_j$, encrypts the new key using $K_{ref}$, and sends it off to the sending device. In embodiments that only allow the server to reset the key:

1) if the receiving device is a client device, the client needs to send a request to the server to generate a new initial key. This request is sent by encrypting using $K_{ref}$.

2) if the receiving device is the server, then the server needs to send to the client a new generated initial key. This information is sent by encrypting using $K_{ref}$.

Using a fixed reference key $K_{ref}$ known by both the client and server allows for key resynchronization at any time. As long as keys go out of sync at random intervals, the use of a fixed key to resynchronize has little to no negative effect on overall link security.

In some embodiments, separate reference key components are maintained to avoid possible synchronization due to simultaneous client and server originated queries. For example, separate sets of key components may be maintained to generate the reference key ($K_{iref}$), and key component increments to generate ($K_i$, $K_{i+1}$, $K_{i+2}$ ... ) for client originated queries; and separate sets of key components may be maintained to generate the reference key ($K_{jref}$), and key component increments to generate ($K_j$, $K_{j+1}$, $K_{j+2}$ ... ) for server originated queries. In these embodiments, resynchronization of key components needed to generate both $K_i$ and $K_j$ can be handled just by the server and/or client in any predetermined combination. The resynchronization of the components needed to generate either $K_i$ or $K_j$ will always be encrypted using $K_{iref}$ or $K_{jref}$ depending on whether it is originated from the client or the server, respectively. When resynchronization components are being sent between the client and the server, not all key components necessary to generate the key increments will be transmitted over the air. In some embodiments, at least one of the key components shall be kept constant and not transmitted over the air.

Figure 9:
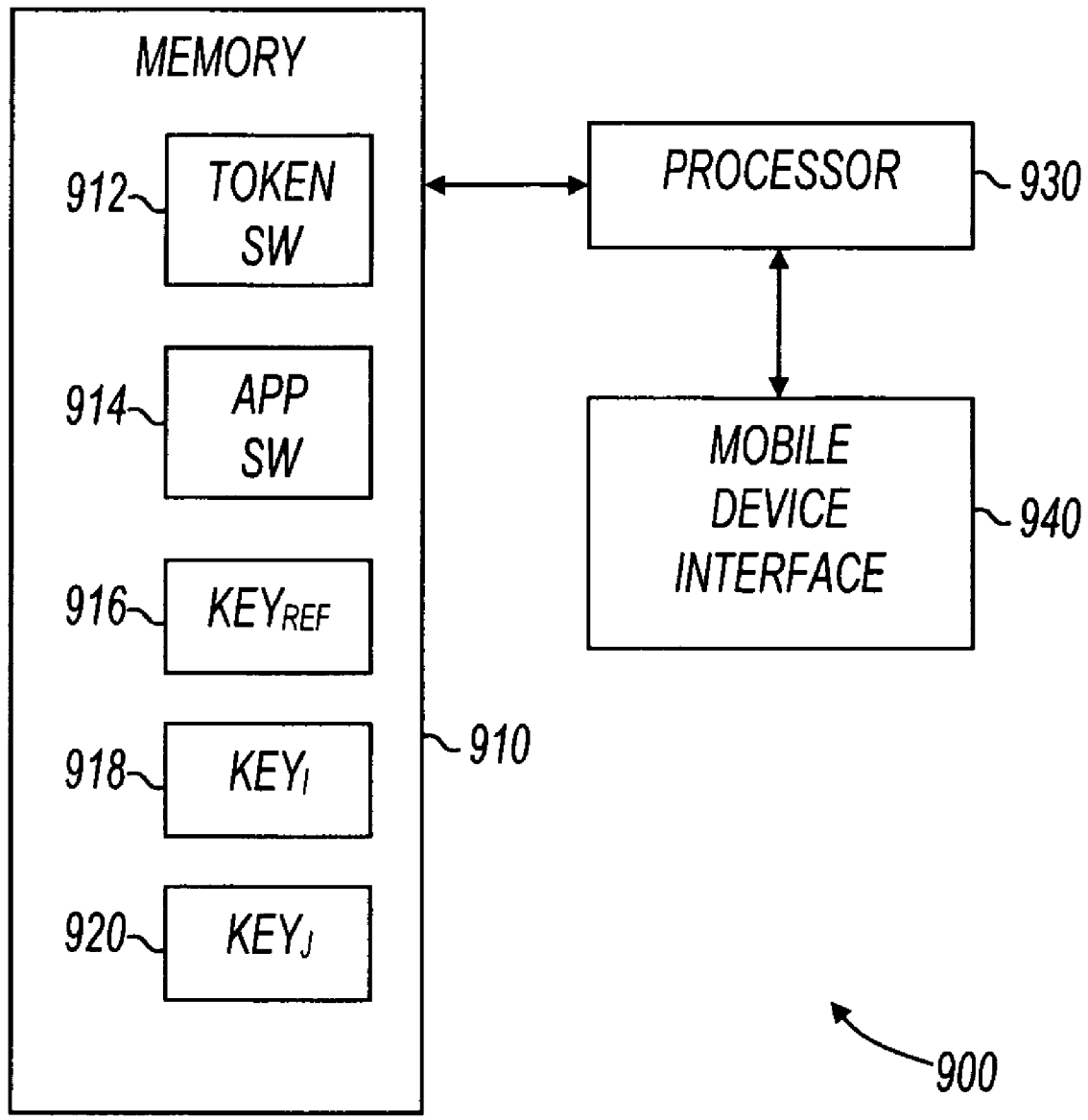
FIG. 9 shows a block diagram of a token.

FIG. 9 shows a block diagram of a token. Token 900 may be coupled to a mobile device to form a secure messaging platform. For example, token 900 may be utilized as token 220 (FIG. 2). Token 900 includes memory 910, processor 930, and mobile device interface 940.

Processor 930 may be any processing element suitable to communicate with memory 910 and mobile device interface 940.

Memory 910 is shown having token software 912 and application software 914. In some embodiments, token 900 is sold or distributed having both token software 912 and application software 914 in memory 910. For example, memory 910 may be nonvolatile memory having token software 912 for execution by processor 930. Also for example, memory 910 may have application software 914 meant to be installed on a device other than token 900. Application software 914 may include drivers, user interface software, secure messaging software, or any other software that may be installed on a device other than token 900.

Application software 914 may operate in any of multiple languages on multiple operating systems. For example, application software 914 may provide a user interface in any regional language. Also for example, application software 914 may run on any operating system (OS).

Memory 910 also includes cryptography components $KEY_{ref}$ 916, $KEY_i$ 918, and $KEY_j$ 920. Cryptography components $KEY_{ref}$ 916, $KEY_i$ 918, and $KEY_j$ 920, may include key components for generating $K_{ref}$, $K_i$, and $K_j$, respectively. In some embodiments, separate cryptography components are maintained for $K_{iref}$ and $K_{jref}$, as described above with reference to FIG. 8. Memory 910 may also store other data such as phone numbers, phone IDs, and the like.

Mobile device interface 940 is an interface that allows token 900 to communicate with a mobile device. Mobile device interface 940 may be any wired or wireless interface. For example, in some embodiments, mobile device interface 940 may be compatible with an add-on slot in a mobile device. Also in some embodiments, mobile device interface 940 may be a universal serial bus (USB) interface.

In operation, token 900 may perform method embodiments of the present invention while processor 930 executes token software 912. For example, token 900 may perform authentication or activation methods, and may also perform operations with the various key components, such as providing key components to a mobile device or updating key components. Token 900 may perform any suitable method embodiments described herein.

Figure 10:
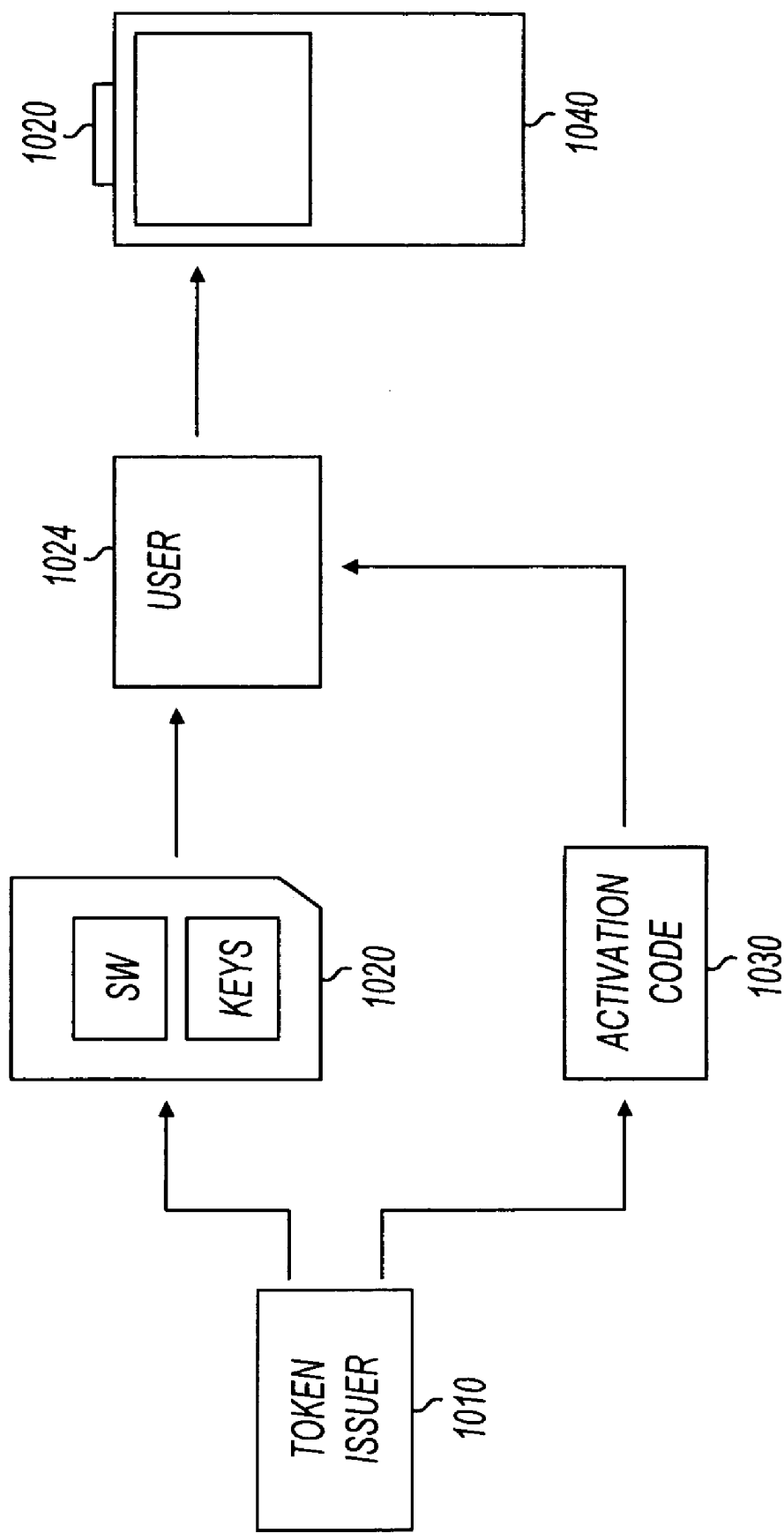
FIG. 10 shows the issuance and activation of a token.

FIG. 10 shows the issuance and activation of a token. A token issuer 1010 may issue token 1020 to a user 1024. As issued by token issuer 1010, token 1020 may include token software and application software as shown in FIG. 9. User 1024 may couple token 1020 with mobile device 1040 and install application software on the mobile device. For example, mobile device 1040 may be a mobile phone capable of executing application software, and token 1020 may supply application software to be installed on the mobile phone. Also for example, mobile device 1040 may be a non-telephonic device such as a personal digital assistant (PDA), or other dedicated hardware, capable of receiving token 1020 in an add-on slot.

Token issuer 1010 also supplies user 1024 with activation code 1030. In some embodiments, the activation code 1030 is supplied separately from token 1020, and in other embodiments, the activation code is supplied concurrently with the token. For example, the activation code may be mailed (post or email) separate from the delivery of the token. Also for example, token 1020 and activation code 1030 may be simultaneously delivered personally to a user, as in the case of a user visiting a store or kiosk to obtain the token. The user uses the activation code to authenticate to the secure messaging platform formed by the combination of token 1020 and mobile device 1040.

Figure 11:
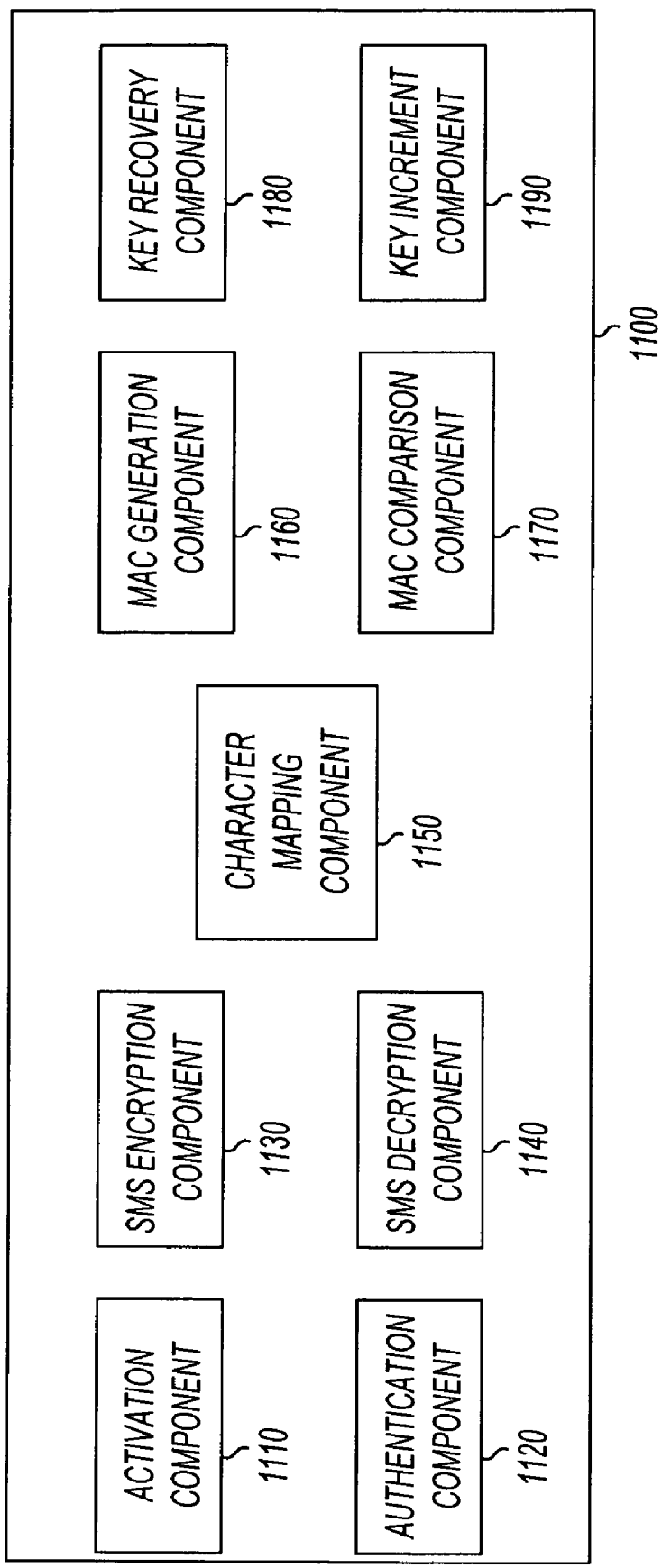
FIG. 11 shows a system for secure SMS communication.

FIG. 11 shows a system for secure SMS communication. System 1100 includes many components, and these components may be implemented in hardware, software, or any combination. For example, system 110 may represent a secure messaging platform that includes a token and a mobile device, with many of the components implemented as application software installed on the mobile device. Further, system 110 may represent a secure messaging platform that does not include a token. Examples of systems without tokens include mobile devices without tokens, and servers such as server 240 (FIG. 2).

System 1100 includes activation component 1110, authentication component 1120, SMS encryption component 1130, SMS decryption component 1140, character mapping component 1150, MAC generation component 1160, MAC comparison component 1170, key recovery component 1180, and key increment component 1190.

Activation component 1110 and authentication component 1120 perform the activation access and post-activation access described above with reference to FIG. 3. SMS encryption component 1130 uses encryption keys to create cipher text from clear text, and MAC generation component generates a MAC from either the clear text or cipher text. Character mapping component 1150 maps cipher text to SMS compatible characters, and vice versa. SMS decryption component 1140 uses decryption keys to create clear text from cipher text. MAC comparison component 1170 may be used to compare received MACs and computed MACs. Key increment component 1190 may be used to update key components as described above with reference to the previous figures. Key recovery component 1180 may be used to resynchronize keys or key components as described above with reference to FIG. 8.

The following paragraphs provide further disclosure of various invention embodiments. Each embodiment is fully defined by the recitation of the corresponding paragraph, and no other elements are to be considered essential for that particular embodiment. The embodiments include:

A. An apparatus compatible with an interface in a mobile device, the apparatus having software installable on the mobile device to allow encrypted short message service (SMS) communications.

A1. The apparatus of A wherein the interface comprises a universal serial bus (USB) interface.

A2. The apparatus of A wherein the interface comprises a memory card compatible interface.

B. An apparatus comprising:
an interface capable of communicating with a mobile device; and
an activation component to collect and store identifying information corresponding to the mobile device upon successful activation.

B1. The apparatus of B further comprising a short message service (SMS) encryption component.

B2. The apparatus of B1 further comprising an authentication component to deny access to the SMS encryption component when the identifying information does not correspond to a device with which the apparatus is communicating.

C. An apparatus comprising:
means for coupling to a mobile device;
means for encrypting short message service (SMS) messages.

C1. The apparatus of C wherein the means for encrypting SMS messages comprises cryptographic key components.

C2. The apparatus of C wherein the means for encrypting short message service SMS messages comprises software to be installed on the mobile device.

C3. The apparatus of C further comprising means for decrypting SMS messages.

D. A method comprising:
providing a user with a token compatible with an interface in a mobile device, the token having software installable on the mobile device to allow encrypted short message service (SMS) communications; and
providing the user with an activation code to allow access to functionality provided by the token.

D1. The method of D wherein providing the user with a token comprises providing a token having data useful to generate at least one cryptographic key.

D2. The method of D wherein providing the user with a token comprises providing a token having data useful to generate at least two cryptographic keys.

D3. The method of D wherein providing the user with a token comprises providing a token having application software for the mobile device, wherein the application software for the mobile device communicates using the encrypted SMS communications.

E. A method comprising:
reading cryptography key components;
generating a cryptography key from the cryptography key components;
encrypting a message using the cryptography key to create an encrypted message; and
formatting the encrypted message into a short message service (SMS) text message.

E1. The method of E further comprising transmitting the SMS text message.

E2. The method of E1 further comprising:
receiving an acknowledgement of successful transmission of the SMS text message; and
updating the cryptography key components.

E3. The method of E wherein reading comprises reading from a memory device temporarily coupled to a device performing the method.

E4. The method of E3 wherein the method is performed by a mobile device.

E5. The method of E4 wherein the device performing the method is a mobile phone.

E6. The method of E wherein reading comprises reading from memory within the device performing the method.

E7. The method of E6 wherein the method is performed by a mobile device.

E8. The method of E7 wherein the device performing the method is a mobile phone.

E9. The method of E wherein the method is performed by a server communicating with multiple mobile devices.

E10. The method of E9 further comprising maintaining cryptography key components corresponding to each of the multiple mobile devices.

F. A method comprising:
receiving a short message service (SMS) message;
reading cryptography key components;
generating a cryptography key from the cryptography key components; and
decrypting the SMS message using the cryptography key.

F1. The method of F further comprising updating the cryptography key components.

F2. The method of F wherein reading comprises reading from a memory device temporarily coupled to a device performing the method.

F3. The method of F2 wherein the method is performed by a mobile device.

F4. The method of F3 wherein the device performing the method is a mobile phone.

F5. The method of F wherein reading comprises reading from memory within the device performing the method.

F6. The method of F5 wherein the method is performed by a mobile device.

F7. The method of F6 wherein the device performing the method is a mobile phone.

F8. The method of F wherein the method is performed by a server communicating with multiple mobile devices.

F9. The method of F8 further comprising maintaining cryptography key components corresponding to each of the multiple mobile devices.

F10. The method of F wherein the received message includes a received message authentication code (RMAC).

F11. The method of F10 further comprising computing a calculated message authentication code (CMAC).

F12. The method of F11 further comprising comparing the RMAC and CMAC.

F13. The method of F12 further comprising updating the cryptography key components when the RMAC and CMAC match.

F14. The method of F13 wherein updating comprises writing the cryptography key components to a memory device temporarily coupled to a device performing the method.

F15. The method of F12 further comprising:
when the RMAC and CMAC do not match, updating the cryptography key components, generating a new cryptography key from the updated cryptography key components, decrypting the SMS message using the new cryptography key, computing a new CMAC, and comparing the new CMAC and RMAC.

F16. The method of F further comprising:
checking an identification of an originating device; and
ignoring the SMS message if the identification is incorrect.

F17. The method of F further comprising:
composing a response message;
reading second cryptography key components;
generating a second cryptography key from the cryptography key components;
encrypting the response message using the second cryptography key to form an encrypted response message; and
formatting the encrypted response message into an SMS compatible format.

G. A method comprising:
prompting a user for an authentication code to allow access to a secure messaging platform including a plurality of components;
verifying the authentication code;
storing identifying information for the plurality of components; and
prompting the user for password to be used for subsequent authentications.

G1. The method of G wherein the plurality of components includes a mobile device and token.

G2. The method of G1 wherein storing identifying information comprises transmitting an ID of the mobile device to a server.

G3. The method of G1 wherein verifying the authentication code comprises transmitting the authentication code to a server.

G4. The method of G further comprising:
prompting the user for the password;
verifying the password;
retrieving identifying information of a mobile device currently in use; and
comparing the identifying information of the mobile device currently in use against stored identifying information.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An apparatus comprising:
a memory card compatible interface to communicate with a mobile device;
a short message service (SMS) encryption component to encrypt SMS messages using a first key;
an SMS decryption component to decrypt SMS messages using a second key;
a key increment component to increment the first key and second key each time they are used; and
a key recovery component to encrypt a new initial key as an SMS message with a reference key when the second key fails to correctly decrypt a received SMS message.

2. The apparatus of claim 1 further comprising a character mapping component to map encrypted SMS messages to SMS compatible characters.

3. The apparatus of claim 1 wherein the SMS encryption component includes a component for message authentication code (MAC) generation.

4. The apparatus of claim 3 wherein the MAC is included within encrypted SMS messages as cipher text.

5. The apparatus of claim 3 wherein the MAC is included with the encrypted SMS messages as clear text.

6. The apparatus of claim 1 wherein the SMS decryption component includes a component for calculated message authentication code (CMAC) generation.

7. The apparatus of claim 6 further comprising a comparison component to compare calculated message authentication codes (CMAC) with received message authentication codes (RMAC).

8. A method comprising:
receiving a first text message that includes an encrypted payload;
decrypting the encrypted payload using a decryption key that changes for each use;
when the decryption is successful, encrypting data to produce cipher text using an encryption key that changes for each use;
when the decryption is unsuccessful, encrypting a new initial key to produce cipher text using a reference key so as to resynchronize the decryption key with a sending device;
mapping the cipher text to short message service (SMS) compatible data; and
sending the SMS compatible data as a second text message.

9. The method of claim 8 further comprising calculating a message authentication code (MAC).

10. The method of claim 9 wherein the MAC is encrypted and included in the cipher text.

11. The method of claim 9 wherein the MAC is included in the text message as clear text.

12. An apparatus comprising:
a memory card compatible interface to communicate with a mobile device;
a short message service (SMS) encryption component to encrypt SMS messages using a first key;
an SMS decryption component to decrypt SMS messages using a second key;
a key increment component to increment the first key and second key each time they are used; and a key recovery component to encrypt a request for a new initial key as an SMS message with a reference key when the second key fails to correctly decrypt a received SMS message.

13. A method comprising:
receiving a first text message that includes an encrypted payload;
decrypting the encrypted payload using a decryption key that changes for each use;
when the decryption is successful, encrypting data to produce cipher text using an encryption key that changes for each use;
when the decryption is unsuccessful, encrypting a request for a new initial key to produce cipher text using a reference key so as to resynchronize the decryption key with a sending device;
mapping the cipher text to short message service (SMS) compatible data; and
sending the SMS compatible data as a second text message.

14. The method of claim 13 further comprising calculating a message authentication code (MAC).

15. The method of claim 14 wherein the MAC is encrypted and included in the cipher text.

16. The method of claim 15 wherein the MAC is included in the text message as clear text.

17. An apparatus comprising:
an interface for communicating with a mobile device; and
a memory having cryptographic information for encrypting and decrypting short message service (SMS) messages, wherein the cryptographic information includes first updateable seeds for producing different cryptographic keys each time encrypted SMS messages are sent or received; and reference seeds for producing a reference cryptographic key when the different cryptographic keys become out of sync;
wherein the memory further includes:
a short message service encryption component to encrypt SMS messages using a first key of the different cryptographic keys;
an SMS decryption component to decrypt SMS messages using a second key of the different cryptographic keys;
a key increment component to increment the first key and second key each time they are used; and
a key recovery component to encrypt a new initial key as an SMS message with the reference cryptographic key when the second key fails to correctly decrypt a received SMS message.

18. The apparatus of claim 17 wherein the memory further includes software to be installed on the mobile device.

19. The apparatus of claim 18 wherein the software includes short message service (SMS) encryption.

20. The apparatus of claim 18 wherein the software includes short message service (SMS) decryption.

21. The apparatus of claim 17 wherein the interface for communicating with a mobile device comprises a universal serial bus (USB) interface.

22. The apparatus of claim 17 wherein the interface for communicating with a mobile device comprises a memory card compatible interface.

* * * * *